United States Patent [19]

Snyder

[11] 4,319,603
[45] Mar. 16, 1982

[54] SELF-CONTAINED SAFETY SYSTEM

[75] Inventor: David E. Snyder, Longview, Tex.

[73] Assignee: U.S. Industries, Inc., New York, N.Y.

[21] Appl. No.: 184,983

[22] Filed: Sep. 8, 1980

[51] Int. Cl.³ ............................................. F16K 31/12
[52] U.S. Cl. .................. 137/492.5; 137/458; 137/625.66
[58] Field of Search ............... 137/492.5, 625.66, 458; 60/413

[56] References Cited

U.S. PATENT DOCUMENTS 4,091,832  5/1978  Snyder .................... 137/625.66 X
4,240,463  12/1980  Moore ............................ 137/492.5

*Primary Examiner*—Harold W. Weakley

[57] ABSTRACT

Disclosed is a safety valve system to maintain the flow of fluid through a flow line when the line pressure is less than a predetermined maximum and greater than a predetermined minimum which includes a hydraulically actuated safety valve inserted in the flow line. A control system is adapted to supply control pressure from a pump to the actuator. A pair of sensors are included to sense line pressure and vent the control system to close the safety valve when the line pressure is greater than the predetermined maximum or less than the predetermined minimum. A ratio accumulator is included to maintain the control pressure at a level proportional to the line pressure and to accommodate changes in the volume of control fluid in the control system due to changes in ambient temperature and leakage.

17 Claims, 7 Drawing Figures

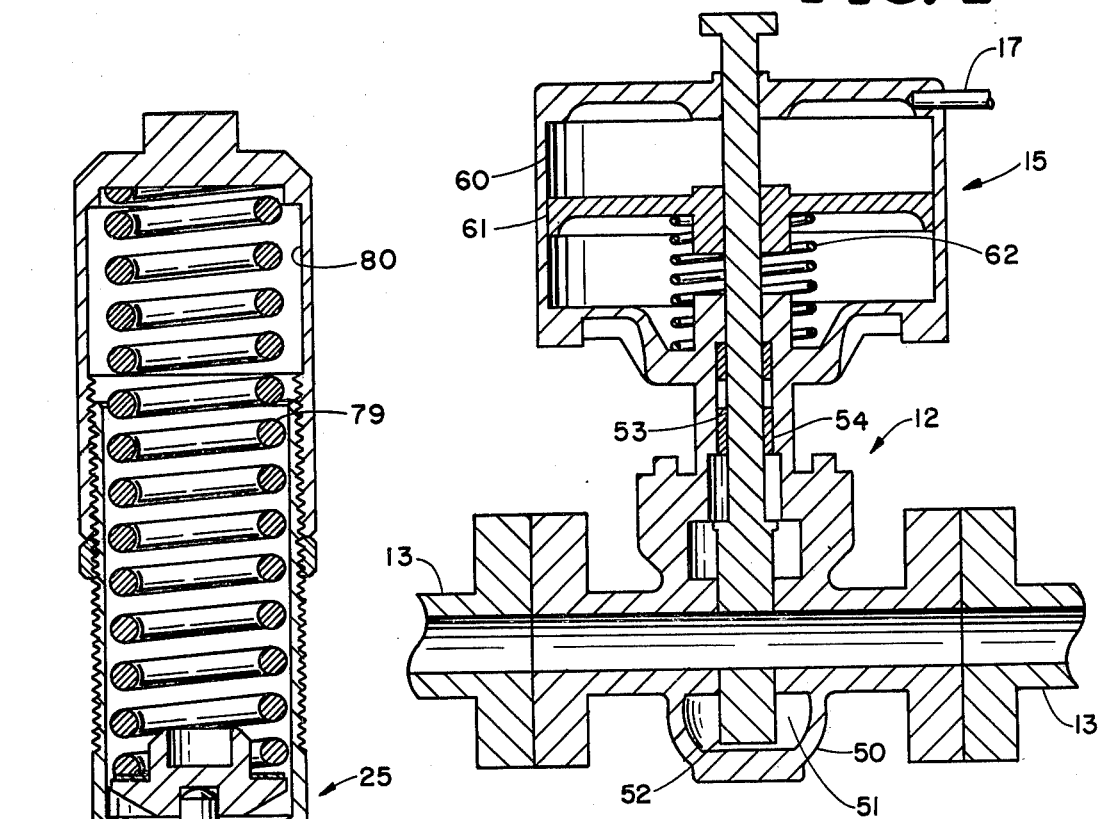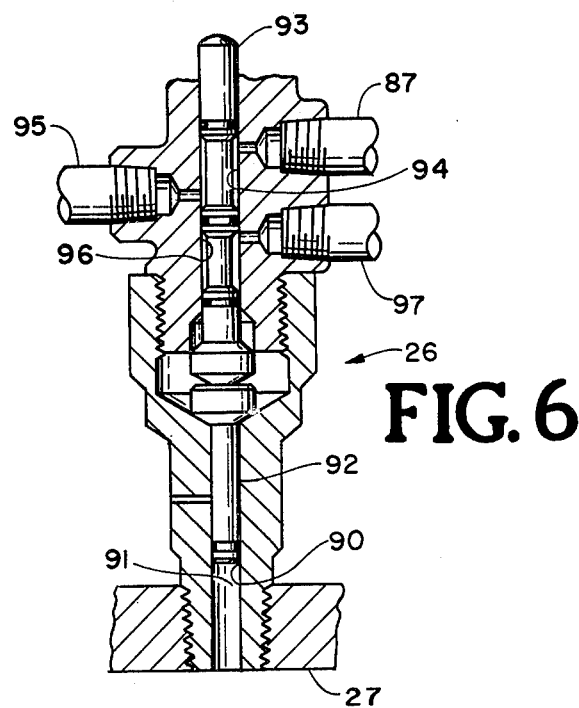

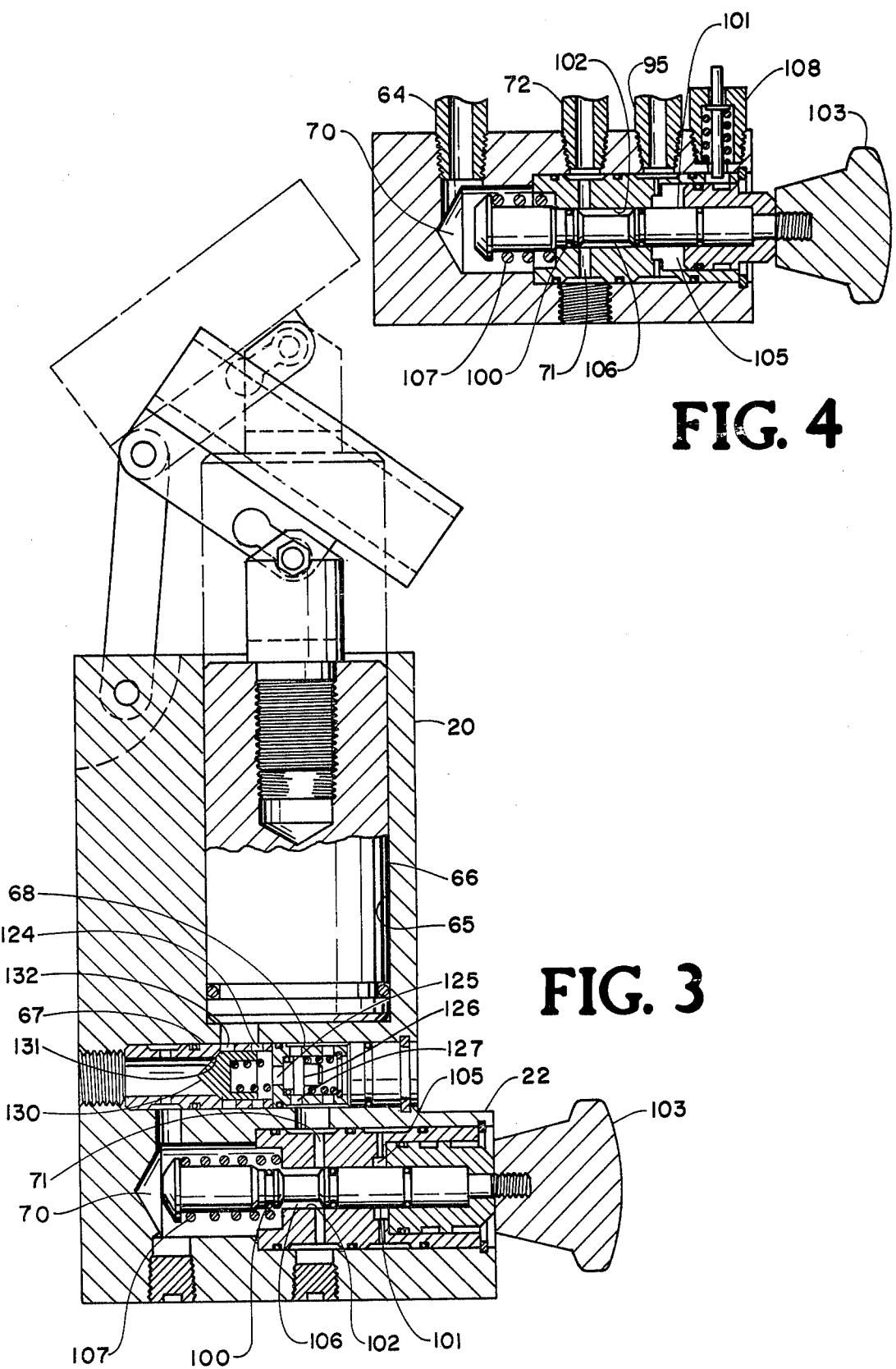

SELF-CONTAINED SAFETY SYSTEM

BACKGROUND OF THE INVENTION

A. Field of the Invention

This invention relates to systems for maintaining the flow of fluid through flow lines when line pressure is less than or greater than a predetermined maximum or minimum pressure, and more particularly, to a self-contained safety system that does not require an external source of fluid pressure.

B. Description of the Prior Art

In the past, various systems have been developed to control the flow of fluid through a flow line when the line pressure is less than or greater than a predetermined maximum or minimum. One such system, which is described in U.S. Pat. No. 3,043,331, includes a control system that supplies pressurized fluid to an actuator that holds a valve inserted in the flow line in a normally open position. A pair of pilot valves is connected in the system and is adapted to sense line pressure and vent the control system when the line pressure is greater than or less than the maximum or minimum. The venting of the control system causes the actuator to allow the safety valve to close.

All of the prior systems have required an independent external source of control pressure. The need for external control pressure is a shortcoming in certain situations, as, for example, in remote locations where power is unavailable. A further shortcoming of the prior systems is the fact that the control pressure is independent of line pressure. The control pressure must produce a force in the actuator that at least balances the force produced by the line pressure upon the effective area of the safety valve. In the prior systems, the control pressure has been selected to remain constant at a level at least as great as that necessary for the maximum expected line pressure. The control pressure is therefore greater than is necessary for normal line pressure, and therefore requires more pumping energy than is normally required and subjects the control system to excess pressure.

It is therefore an object of the present invention to provide a self-contained safety system that does not require an independent source of control pressure.

It is a further object of the present invention to provide a safety valve system in which the control pressure is proportional to the line pressure.

SUMMARY OF THE INVENTION

Briefly stated, the foregoing and other objects and advantages of the present invention are accomplished by providing a hydraulically actuated safety valve inserted in the flow line which is operated by control pressure supplied to the actuator by a control system. A pump is provided to supply control pressure to the control system. A pair of sensors, which are adapted to sense line pressure, are inserted in the control system to vent the system when the line pressure is greater than or less than the predetermined maximum or minimum. A ratio accumulator is included in the system to maintain the control pressure at a level proportional to the line pressure and to accommodate changes in the volume of the control fluid due to changes in ambient temperature and leakage.

The ratio accumulator includes a pair of cylinders having connected pistons arranged for reciprocating motion therein. The first cylinder communicates with the line pressure which exerts a force on the first piston that is transmitted to the second piston. The second piston produces a pressure in the second cylinder, which communicates with the control system, that is related to the line pressure by the ratio of the area of the first piston to the second piston.

BRIEF DESCRIPTION OF THE DRAWINGS

FIG. 2 is a sectional view of a safety valve and actuator of the present invention;

FIG. 3 is a sectional view of the pump and relay of the present invention;

FIG. 4 is a sectional view showing details of the relay of the present invention;

FIG. 5 is a sectional view of the low pressure sensor of the present invention;

FIG. 6 is a partial sectional view of the high pressure sensor of the present invention.

DESCRIPTION OF THE PREFERRED EMBODIMENT

Figure 1:
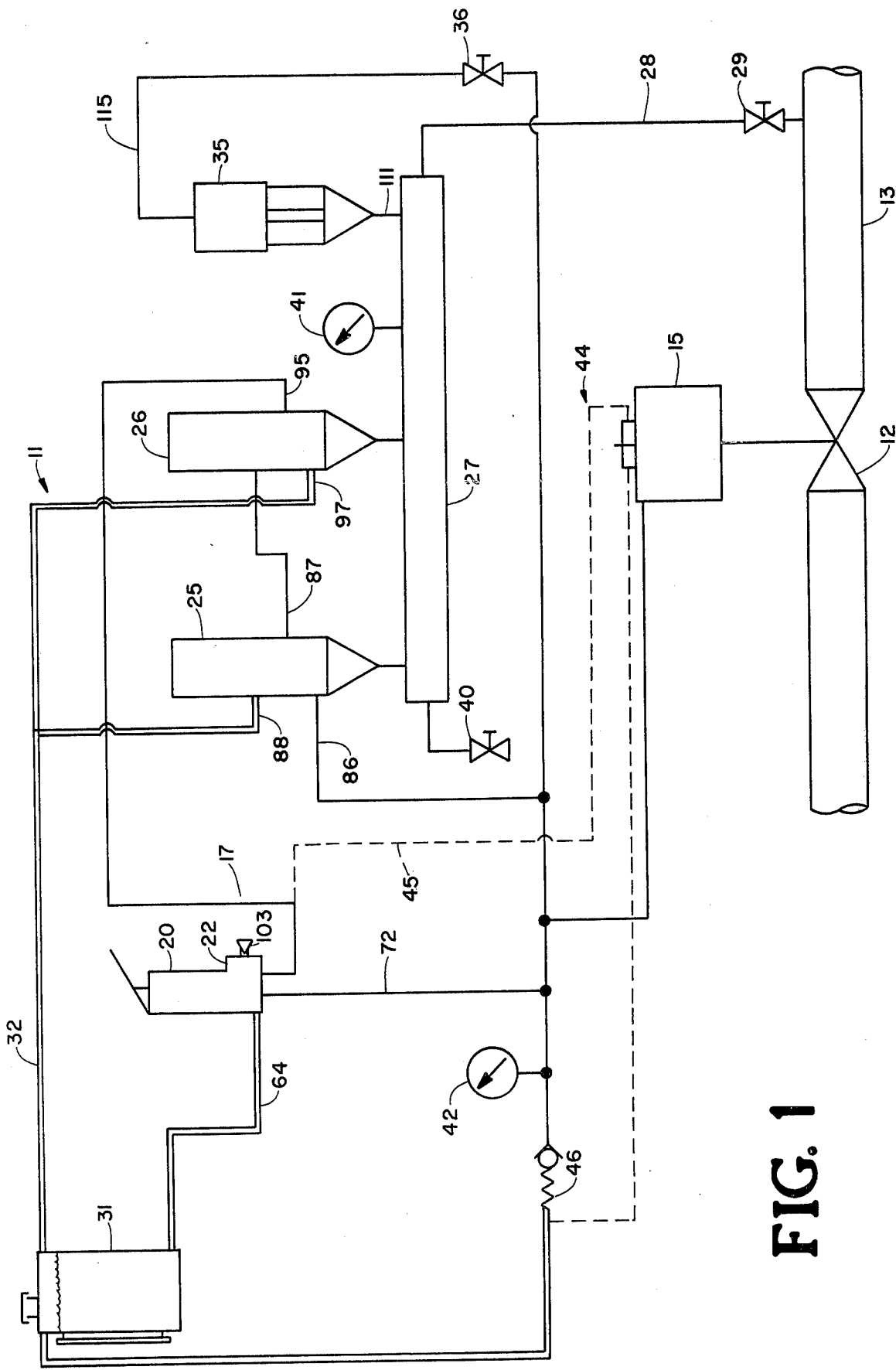
FIG. 1 is a schematic drawing of the system of the present invention.

Referring now to the drawings, the system of the present invention is shown in FIG. 1 and is designated generally by the numeral 11. System 11 is used in connection with a safety valve 12 that is inserted in a flow line 13. Safety valve 12 is actuated by a hydraulic actuator 15 that is supplied with pilot fluid by a control system, designated generally by the numeral 17. Control system 17 is pressurized by a pump 20, which, in the preferred embodiment, includes an integral relay 22.

System 11 includes a low pressure sensor 25 and a high pressure sensor 26 which are connected in series to control system 17. Low pressure sensor 25 and high pressure sensor 26 are connected to a manifold 27 which is connected to flow line 13 by a conduit 28 through a valve 29. When the line pressure in flow line 13 is less than a predetermined minimum or greater than a predetermined maximum, low pressure sensor 25 or high pressure sensor 26, respectively, vent to relieve the pilot pressure in control system 17 to cause actuator 15 to close safety valve 12. The fluid vented by sensors 25 and 26 is returned to a reservoir 31 through a return system 32.

To compensate for changes in control pressure due to changes in ambient temperature and leakage and to maintain the control pressure at a level proportional to the line pressure in flow line 13, a ratio accumulator 35 is provided. Ratio accumulator 35 is connected to manifold 27 and may be isolated from control system 17 by a valve 36.

A valve 40 is provided to vent manifold 27 for test purposes. Also, a pair of gauges 41 and 42 are provided to indicate line pressure and control pressure, respectively.

System 11 may include a drift preventer designated generally by the numeral 44 which is adapted to cause safety valve 12 to close if the closure means of safety valve 12 drifts more than a predetermined amount. Drift preventer 44 includes valve means (not shown) operated by movement of safety valve 12 for venting control system 17 through a conduit 45. A relief valve 46 is provided to protect system 11 from overpressure.

Referring now to FIG. 2, safety valve 12 of the present invention is a standard gate valve connected in flow line 13 by flanges or other standard connection means. Safety valve 12 includes a valve body 50 which encloses a valve chamber 51. A slab gate 52 is mounted within valve chamber 51 for reciprocal movement between an open position, as shown in FIG. 2, and a closed position. Gate 52 is operated by a valve stem 53 which is adapted for reciprocating motion into and out of valve chamber 51 through a set of seals 54.

Actuator 15 includes a cylinder 60 and a piston 61. Piston 61 is fixedly attached to valve stem 53 and is adapted to hold gate 52 in the open position by control pressure within cylinder 60 supplied by control system 17. A spring 62 is compressed behind piston 61 to close valve 12 in the absence of line pressure.

The line pressure within valve chamber 51 exerts a force on stem 53 that tends to urge gate 52 toward the closed position. The magnitude of such force is equal to the line pressure multiplied by the effective area of stem 53. In order to balance the force exerted upon stem 53, it is necessary that the ratio of the control pressure in cylinder 60 to the line pressure be equal to or greater than the ratio of the area of stem 53 to the area of piston 61.

Referring now to FIGS. 3 and 4, pump 20 is preferably a low pressure, high volume hydraulic pump including a cylinder 65 and a hand operated piston 66. Pump 20 includes an inlet check valve, designated generally by the numeral 67, which includes a spring loaded closure member 130 and seat 131, and an outlet check valve, designated generally by the numeral 68, which includes a spring loaded closure member 126 that closes a port 125. As best seen in FIGS. 1 and 4, pump 20 is connected to reservoir 31 by a conduit 64 which is connected to a space 70. When the piston 66 is moved in cylinder 65 to the position shown in phantom in FIG. 3, closure member 130 of inlet check valve 67 lifts off seat 131 and outlet check valve 68 closes, thereby allowing fluid to flow from space 70 through a port 132 into cylinder 65. Conversely, when piston 66 is forced into cylinder 65, closure member 130 seats on seat 131 and closure member 126 lifts away from port 125, thereby allowing fluid to flow through ports 124 and 127 into a space 71 which, when the relay is in the open position as shown in FIG. 4, is connected to a conduit 72 which is part of control system 17. If the relay is in the closed position as shown in FIG. 3, the fluid displaced by piston 66 in cylinder 65 upon inward movement of piston 66 flows through the outlet check 68 to space 71 which is opened to space 70, thereby allowing the fluid to return to the reservoir 31 through conduit 64.

Referring now to FIG. 5, low pressure sensor 25 in the preferred embodiment includes a chamber 75 that is connected to manifold 27 by a conduit 76. Fluid from flow line 13 flows freely into chamber 75, and the pressure therein is substantially equal to the line pressure. The pressure within chamber 75 acts upon a piston 77 and through a spool 78 to compress a spring 79 disposed within a chamber 80. The length of chamber 80 is adjustable in order to vary the force exerted by spring 79. The force of spring 79 is selected to be less than the force exerted on piston 77 by the normal range of line pressures. However, if the line pressure drops below a predetermined minimum, the force of spring 79 overcomes the force on piston 77 and drives piston 77 and spool 78 downwardly.

Spool 78 is adapted to travel axially within a chamber 82 and has thereon a pair of axially spaced apart reduced diameter portions which, together with chamber 82, form a pair of annular spaces 83 and 84. When the line pressure exceeds the predetermined minimum, control pressure flows from control system 17 into lower annular space 83 through a conduit 86 and out of lower annular space 83 back into control system 17 through a conduit 87. As long as line pressure exceeds the predetermined minimum, low pressure sensor 25 will allow communication between conduits 86 and 87. However, if line pressure drops below the predetermined minimum, then spool 78 will move axially downwardly and will isolate inlet fluid from conduit 86 and communicate conduit 87 to annular space 84 and into a conduit 88 which is connected to return system 32, thereby causing pilot pressure to the pilot piston of relay 22 to drop allowing the relay to move to its closed position, thus allowing the control fluid in actuator 15 to be released to the reservoir, thus allowing the safety valve 12 to close.

High pressure sensor 26 is depicted in part in FIG. 6 and includes a chamber 90 which is connected to manifold 27 by conduit 91. The line pressure in chamber 90 acts upon a piston 92. The force on piston 92 is transmitted through a spool 93 to a spring that is substantially the same as spring 79 and which is contained in a chamber that is substantially the same as chamber 80. The force of the spring acting against piston 92 is adjusted such that it is equal to the force exerted upon piston 92 by the predetermined maximum line pressure. When the line pressure exceeds the predetermined maximum, the force on piston 92 overcomes the force of the spring and drives piston 92 axially upwardly.

When the line pressure is less than the predetermined maximum, control pressure from conduit 87 flows into an upper annular space 94 around spool 93 and into a conduit 95 which is connected to control system 17. Accordingly, when the line pressure is less than the predetermined maximum, high pressure sensor 26 will allow communication between conduits 87 and 95. However, if line pressure exceeds the predetermined maximum, then piston 92 is driven axially upwardly and will isolate inlet fluid in conduit 87 and communicate conduit 95 to a lower annular space 96 and into a conduit 97 which is connected to return system 32, thereby causing the pilot pressure to the pilot piston of relay 22 to drop allowing the relay to move to its closed position, thus allowing the control fluid in actuator 15 to be released to the reservoir 31, thus allowing the safety valve 12 to close.

Returning now to FIGS. 3 and 4, relay 22 is a spring biased device that causes rapid and complete exhaustion of control pressure in response to drops in pilot pressure caused by sensors 25 or 26. Relay 22 includes an annular closure member 100 fixed to a cylindrical member 101. Cylindrical member 101 has a handle 103 at one end thereof and a shoulder on the other end thereof against which a biasing force is applied and which is adapted for axial movement within a sleeve 102 between a closed position as shown in FIG. 3, and an open position, as shown in FIG. 4.

Cylindrical member 101 is biased to the closed position by a spring 107. A space 105 is formed between cylindrical member 101 and a sleeve 102. Space 105 is filled with pilot fluid by conduit 95, which is the outlet from high pressure sensor 26. A second space 106 is formed between cylindrical member 101 and sleeve 102.

Space 106 communicates with space 71 which is supplied with control pressure from pump 20. When the line pressure is between the predetermined maximum and minimum, the pressure in spaces 106 and 105 is equal. Since the annular size of space 105 is greater than that of space 106, as long as the pressures therein are equal, cylindrical member 101 is biased toward the right against the force of a spring 107 as shown in the drawings. However, if sensors 25 or 26 sense a line pressure outside the predetermined maximum or minimum, then one or the other of them vents through return system 32 to reservoir 31 and causes a drop in pressure in space 105. The movement of either sensor 25 or 26 to the venting position causes the pressure in conduit 72 to be maintained. Accordingly, the pressures in spaces 105 and 106 become unequal, and the pressure in space 106 is exposed to equal areas by seal members thus exerting equal linear forces. The force of spring 107 urges cylindrical member 101 toward the left thereby opening closure member 100 and allowing fluid from conduit 72 to flow directly into space 70 and reservoir 31. Relay 22 includes a spring loaded bypass lockout 108 for use at start-up and during sensor testing.

Figure 7:
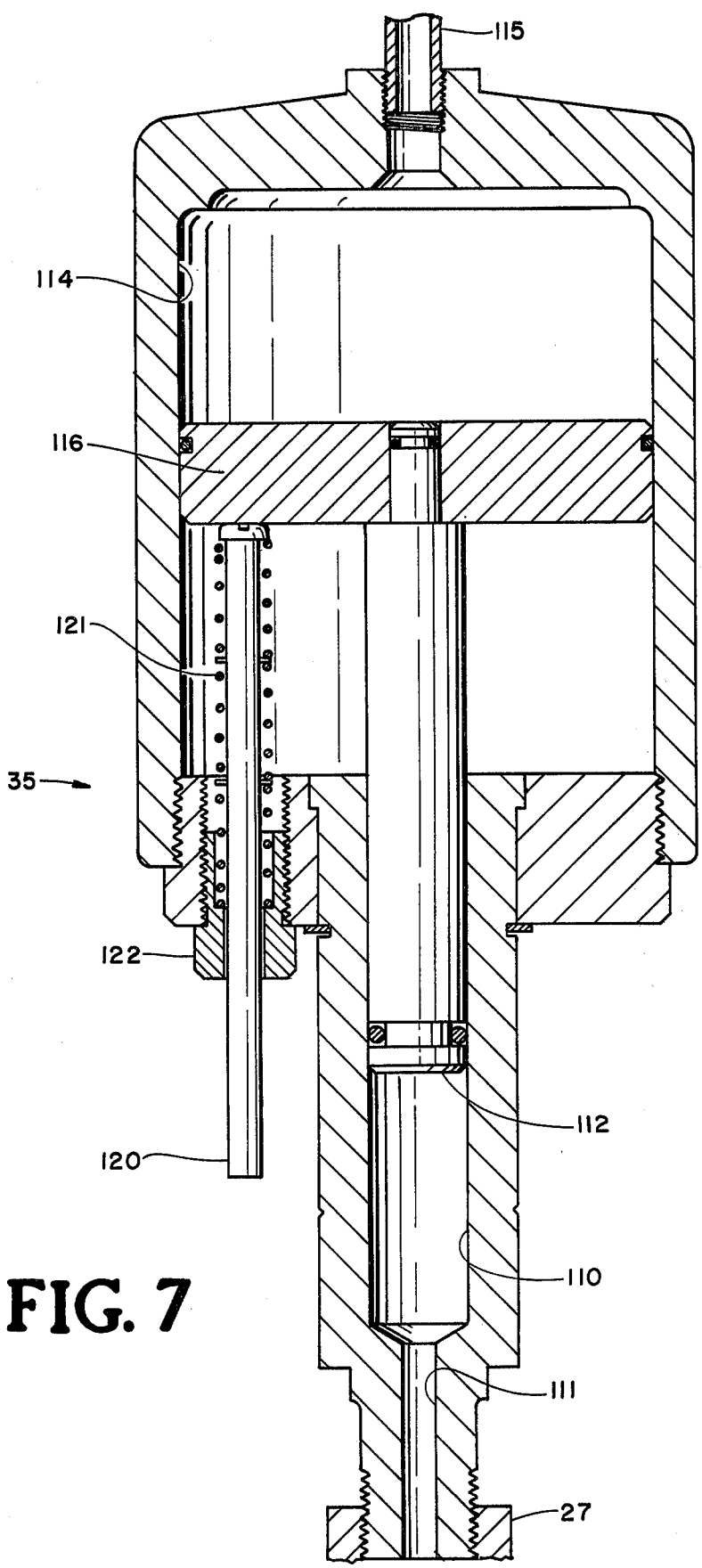
FIG. 7 is a sectional view of the ratio accumulator of the present invention.

Referring now to FIG. 7, ratio accumulator 35 includes a first cylinder 110 which is connected to and communicates with manifold 27 through a conduit 111. First cylinder 110 has slidingly mounted therein a first piston 112. The line pressure in first cylinder 110 exerts a force on piston 112 that is equal to the line pressure multiplied by the cross-sectional area of piston 112.

Ratio accumulator 35 also includes a second cylinder 114 which is connected to control system 17 by a conduit 115. Cylinder 114 has slidingly mounted therein a piston 116 which is fixedly connected to piston 112. The line pressure exerts a force on piston 112 that is balanced by the force exerted by the control pressure upon piston 116. When the system is in equilibrium, the ratio of the line pressure in cylinder 110 to the pilot pressure in cylinder 114 is equal to the inverse of the ratio of the area of piston 112 to the area of piston 116. The ratio of the area of piston 112 to that of piston 116 is chosen to be equal to or greater than the ratio of the effective area of stem 53 to the area of piston 61 of actuator 15 so that control pressure is sufficient throughout the range of line pressures to keep valve 12 open.

Cylinder 114 is filled with fluid by means of pump 20. During the course of operations, changes in the ambient temperature may cause expansion or contraction of the control fluid volume or minor leakage may occur. Such changes in volume are compensated for by the movement of piston 116 in cylinder 114, but as long as there is any fluid remaining in cylinder 114, system pressure is always maintained, and such pressure is always directly proportional to the line pressure. The volume of fluid in cylinder 114 is totally usable and ratio accumulator 35 adds pressure to control system 17 in totally linear fashion. If a leak in control system 17 were to occur, pressure would be maintained at the proper level until cylinder 114 became completely exhausted. The volume of cylinder 114 may be made large enough so that system 11 may be operated for extended periods of time without the need to pump additional fluid.

In order to monitor the amount of volume available in cylinder 114, indicator means are provided. In the preferred embodiment, indicator means include a rod 120 which is maintained in contact with the lower side of piston 116 by a spring 121. Rod 120 moves through a guide 122 and is visible on the outside of the accumulator 35. Appropriate marks may be placed on the exterior of the body of accumulator 35 to indicate the usable volume remaining in cylinder 114. When rod 120 indicates that the usable volume in cylinder 114 is low, pump 20 may be used to refill cylinder 114.

In operation, system 11 is installed by inserting safety valve 12 and conduit 28 into flow line 13. Control pressure is supplied to control system 17 by pump 20. During initial pumping, relay is locked out by lockout 108 so that control fluid flows into control system 17 and not into reservoir conduit 64. When flow line pressure is within the predetermined maximum and minimum limits, pressure is admitted to relay 22 through conduit 95 from sensors 25 and 26, lockout 108 automatically disengages and the system 11 becomes operational. Sensors 25 and 26 may be tested and, if necessary, adjusted by closing valve 29 to isolate manifold 27 from flow line 13. A hand pump may then be connected to manifold 27 through valve 40. The hand pump may then be used to vary the pressure manifold 27. The actuation of sensors 25 and 26 in response to pressure changes during testing may be noted by feeling movement of handle 103, which should be held with the lockout 108 in the out position so that relay 22 is not inadvertently actuated during testing.

After system 11 has been placed in service, safety valve 12 will remain open until line pressure becomes less than or greater than the predetermined minimum or maximum. Ratio accumulator 35 compensates for changes in volume and maintains control pressure at a level proportional to line pressure. If line pressure moves outside the desired range, sensor 25 or 26 actuates to vent control system 17 to exhaust ratio accumulator 35 and actuator 15, thereby closing safety valve 12. Safety valve 12 will thereafter remain closed until system 11 is re-pressurized.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. Safety valve system for maintaining the flow of fluid through a flow line when the line pressure is less than a predetermined maximum and greater than a predetermined minimum, which comprises:

a safety valve inserted in said flow line;
an actuator connected to said safety valve;
a control system adapted to supply control pressure to said actuator;
a pump adapted to supply control pressure to said control system;
a high pressure sensor adapted to sense line pressure and vent said control system when said line pressure is greater than said predetermined maximum;
a low pressure sensor adapted to sense line pressure and vent said control system when said line pressure is less than said predetermined minimum; and accumulator means for maintaining said control pressure at a level proportional to said line pressure and accommodating changes in the volume of said control system due to changes in ambient temperature and leakage.

2. The system as claimed in claim 1 including a relay operated by said sensors to hasten the venting of said control system when said line pressure is greater than or less than said predetermined maximum or minimum.

3. The system as claimed in claim 1, wherein:
said safety valve includes a gate, a valve chamber having said line pressure therein and a stem connected to said gate and extending out of said valve chamber through seal means;
said actuator includes a cylinder having a piston arranged for reciprocating movement therein, said piston being connected to said stem, wherein the area of said piston and the effective area of said stem are related in a first ratio; and
said accumulator includes a first cylinder communicating with said line pressure and a first piston arranged for reciprocating motion therein, and a second cylinder communicating with said control system and a second piston arranged for reciprocating motion therein, said first piston being connected to said second piston, wherein the areas of said second and first pistons are related in a second ratio that is equal to or less than said first ratio.

4. The system as claimed in claim 1 including means for indicating the usable volume of said accumulator means.

5. The system as claimed in claim 1 including a reservoir means for collecting fluid vented from said control system and supplying fluid to said pump.

6. The system as claimed in claim 1 wherein said pump is adapted to be operated by hand.

7. The system as claimed in claim 1 wherein said pump is the sole source of pressure for said control system.

8. A system as claimed in claim 7 wherein the control system is a closed loop hydraulic circuit which does not externally exhaust any control system fluid or line fluids.

9. A system for operating a pressure operated actuator to actuate a safety valve to maintain the flow of fluid through a flow line when the line pressure is less than a predetermined maximum and greater than a predetermined minimum, which comprises:
a control system adapted to supply control pressure to said actuator;
a pump adapted to supply control pressure to said control system;
a high pressure sensor adapted to sense line pressure and vent said control system when said line pressure is greater than said predetermined maximum;
a low pressure sensor adapted to sense line pressure and vent said control system when said line pressure is less than said predetermined minimum; and
accumulator means for maintaining said control pressure at a level proportional to said line pressure and accommodating changes in the volume of said control system due to changes in ambient temperature and leakage.

10. The system as claimed in claim 9 including a relay operated by said sensors to hasten the venting of said control system when said line pressure is greater than or less than said predetermined maximum or minimum.

11. The system as claimed in claim 9, wherein:
said safety valve includes a gate, a valve chamber having said line pressure therein, and a stem connected to said gate and extending out of said valve chamber through seal means;
said actuator includes a cylinder having a piston arranged for reciprocating movement therein, said piston being connected to said stem wherein the area of said piston and the effective area of said stem are related in a first ratio; and
said accumulator includes a first cylinder communicating with said line pressure and a first piston arranged for reciprocating motion therein, and second cylinder communicating with said control system and a second piston arranged for reciprocating motion therein, said first piston being connected to said second piston, wherein the areas of said second and first pistons are related in a second ratio that is equal to or less than said first ratio.

12. The system as claimed in claim 9 including means for indicating the usable volume of said accumulator means.

13. The system as claimed in claim 9 including a reservoir means for collecting fluid vented from said control system and supplying fluid to said pump.

14. The system as claimed in claim 9 wherein said pump is adapted to be operated by hand.

15. The system as claimed in claim 9 wherein said pump is the sole source of pressure for said control system.

16. The system as claimed in claim 15 wherein the control system is a closed loop hydraulic circuit which does not externally exhaust any control system fluid or line fluids.

17. For use in a safety system for maintaining the flow of fluid through a flow line when line pressure is less than a predetermined maximum and greater than a predetermined minimum, wherein the safety system includes a safety valve inserted in the flow line, an actuator connected to the safety valve, a control system adapted to supply control pressure to the actuator, a high pressure sensor adapted to sense line pressure and vent the control system when the line pressure is greater than the predetermined maximum, a low pressure sensor adapted to sense line pressure and vent the control system when the line pressure is less than the predetermined minimum, apparatus for maintaining the control pressure at a level proportional to the line pressure and accomodating changes in the volume of the control system due to changes in ambient temperature or leakage, which comprises:
a first cylinder adapted for communication with said line pressure;
a first piston mounted in said first cylinder for reciprocating motion therein;
a second piston connected to said first piston to move therewith; and
a second cylinder containing said second piston for reciprocating motion therein, said second cylinder being adapted for connection to said control system.

* * * * *